(12) United States Patent
Rüdiger et al.

(10) Patent No.: US 7,790,287 B2
(45) Date of Patent: Sep. 7, 2010

(54) LIGHT-SCATTERING SHEET HAVING HIGH LIGHT TRANSMISSION AND IMPROVED ANTISTATIC PROPERTIES

(75) Inventors: Claus Rüdiger, Krefeld (DE); Heinz Pudleiner, Krefeld (DE); Klaus Meyer, Dormagen (DE); Jürgen Röhner, Köln (DE); Tanja Grüter-Reetz, Krefeld (DE); Fumika Kaneko, Tokyo (JP)

(73) Assignee: Bayer MaterialScience AG, Leverkusen (DE)

( * ) Notice: Subject to any disclaimer, the term of this patent is extended or adjusted under 35 U.S.C. 154(b) by 191 days.

(21) Appl. No.: 11/507,277

(22) Filed: Aug. 21, 2006

(65) Prior Publication Data

US 2007/0060681 A1    Mar. 15, 2007

(30) Foreign Application Priority Data

Aug. 24, 2005   (DE) ..................... 10 2005 040 313

(51) Int. Cl.
*B32B 27/36* (2006.01)

(52) U.S. Cl. ...................... 428/412; 428/523

(58) Field of Classification Search ................. 428/412, 428/500, 523; 524/155
See application file for complete search history.

(56) References Cited

U.S. PATENT DOCUMENTS

| | | | |
|---|---|---|---|
| 6,358,601 B1 * | 3/2002 | Bilkadi | 428/323 |
| 6,914,092 B1 * | 7/2005 | Dobler et al. | 524/157 |
| 7,169,333 B2 * | 1/2007 | Dobler et al. | 252/519.3 |
| 2003/0031844 A1 | 2/2003 | Gorny et al. | 428/212 |
| 2004/0066645 A1 | 4/2004 | Graf et al. | 362/31 |
| 2004/0228141 A1 | 11/2004 | Hay et al. | 362/555 |

FOREIGN PATENT DOCUMENTS

| | | |
|---|---|---|
| EP | 555197 A2 * | 8/1993 |
| EP | 0897950 A2 | 2/1999 |
| EP | 634 445 B1 | 8/1999 |
| JP | 11-5241 | 1/1999 |

* cited by examiner

*Primary Examiner*—Thao T. Tran
(74) *Attorney, Agent, or Firm*—Connolly Bove Lodge & Hutz LLP

(57) ABSTRACT

A solid sheet comprising transparent polycarbonate matrix, particles of a transparent polymer and an antistatic agent is disclosed. Characterized in that the refractive index of said matrix differs from that of said polymer, the sheet is suitable in making diffuser plate in flat screens.

9 Claims, No Drawings

LIGHT-SCATTERING SHEET HAVING HIGH LIGHT TRANSMISSION AND IMPROVED ANTISTATIC PROPERTIES

FIELD OF THE INVENTION

The invention relates to a sheet and in particular to a sheet of a polymeric composite.

TECHNICAL BACKGROUND OF THE INVENTION

Light-scattering translucent products made of polycarbonate with different light-scattering additives, and shaped parts produced therefrom, are already known from the prior art.

Thus, for example, EP-A 634 445 discloses light-scattering compositions containing vinyl acrylate-based polymer particles with a core/shell morphology in combination with inorganic particles, especially $TiO_2$.

The use of light-scattering polycarbonate films in flat screens is described in US 2004/0066645. Polyacrylates, PMMA, polytetrafluoroethylenes, polyalkyl trialkoxysiloxanes and mixtures of these components are mentioned here as light-scattering pigments.

Multi-layer sheets are described in EP 1404520, which contain perfluoro-alkylsulfonic acid salts as an antistatic agent.

In US 2004/0228141, antistatic light-scattering PC films are described in thicknesses of 0.025 to 0.5 mm, which contain fluorinated phosphonium sulfonates as antistatic agents.

In JP 11-005241, light-scattering sheets based on PMMA are described, which consist of a base layer with inorganic scattering pigments and a transparent outer layer with an antistatic agent.

However, the diffuser plates known from the prior art exhibit unsatisfactory stability of the color during lifetime with, at the same time, high brightness and, in particular, they do not have adequate antistatic properties.

When these sheets are handled, i.e. sawn and handled during assembly of the flat screen, however, the problem arises that these sheets become statically charged relatively easily and, for this reason, attract dust to their surface particularly strongly. This dust on the surface drastically reduces the optical properties of these sheets. The light density of the backlight units (BLUs) used in the flat screens is markedly reduced as a result. The aim of this invention is therefore to provide diffuser plates exhibiting a reduced electrostatic charge through a reduced surface resistivity, but at the same time, the optical properties of the diffuser plates are not decreased by the use of the corresponding additives.

The suitability of the light-scattering sheets for their suitability as backlight units for LCD flat screens depends on the brightness of the overall system and on the antistatic properties.

In principle, a backlight unit (direct light system) has the construction described below. It generally consists of a housing, in which, depending on the size of the backlight unit, different numbers of fluorescent tubes, so-called CCFLs (cold cathode fluorescent lamps) are arranged. The interior of the housing is provided with a light-reflecting surface. The diffuser plate, which has a thickness of 1 to 3 mm, preferably a thickness of 2 mm, rests on this lighting system. On the diffuser plate there is a set of films, which may have the following functions: light scattering (diffuser films), circular polarizers, focusing of the light in the forward direction by so-called BEF (brightness enhancing film) and linear polarizers. The linear polarizing film lies directly below the LCD display positioned above it.

Completely surprisingly, it has now been found that diffuser plates containing an antistatic agent from the class of the perfluoroalkylsulfonic acid salts or the class of OH-functionalised polypropylene oxides have an unexpectedly high brightness in the BLU described above. This effect is displayed even more strongly in combination with the set of films typically used in a backlight unit (BLU).

In addition, these diffuser plates exhibit markedly lower surface resistivity than the comparative samples without an antistatic agent. This may be demonstrated on the one hand by determining the surface resistivity, but also by evaluating these sheets in accordance with the dust test described in the examples below. Thus, these sheets exhibit a favorable property of low dust attraction from the environment in the assembly of the BLU.

SUMMARY OF THE INVENTION

A solid sheet containing a polymeric composite characterized by its light scattering, high light transmission and antistatic properties is disclosed. The sheet that is particularly suitable as a diffuser plate in flat screens includes a composite having a transparent polymeric matrix, preferably polycarbonate, a homogeneously dispersed transparent polymeric particles and an optional antistatic agent. The refractive index of the polymeric matrix is different from that of the particles. In an additional embodiment, the antistatic agent is included in one or more layers adherently bound to at least one of the surfaces of the solid sheet said layers optionally applied to the said surfaces by co-extrusion with the solid sheet.

DETAILED DESCRIPTION OF THE INVENTION

The solid sheets according to the invention exhibit high light transmission together with high light scattering and may be used, for example, in the lighting systems of flat screens (LCD screens). High light scattering together with high light transmission is of decisive importance in the present context. The lighting system of these flat screens may either take the form of a lateral light coupling (edgelight system) or, for larger screen sizes, for which the lateral light coupling is no longer sufficient, via a backlight unit (BLU), in which the direct lighting behind the diffuser plate must be spread as evenly as possible by this (direct light system). Furthermore, the solid sheets (diffuser plates) described here are distinguished by high color uniformity over a prolonged period together with unimpaired luminance (brightness) during operation of the flat screens.

This invention also provides the use of the solid sheets according to the invention as diffuser plates for flat screens, particularly in the backlighting of LCD displays.

In a first embodiment of the invention, the solid sheet is made of a composition containing 76 to 99.89 wt. % of a transparent polymeric composition, preferably polycarbonate, 0.01 to 20 wt. % polymer particles, preferably acrylate-based, more preferably having a core-shell morphology, and having a particle size of between 1 and 100 µm, and 0.1 to 4.0% of an antistatic agent selected from among perfluoro-alkylsulfonic acid salts and OH-functionalized polypropylene oxides.

In another embodiment of the invention, the solid sheet comprises a base layer consisting of a composition containing 76 to 99.89 wt. % of a transparent polycarbonate, 0.01 to 20 wt. % acrylate-based polymer particles with a core-shell morphology, these polymer particles having a particle size of between 1 and 100 μm, and at least one coextrusion layer, preferably comprising a transparent polycarbonate, and containing 0.1 to 4.0% of an antistatic agent from the class of the perfluoroalkylsulfonic acid salts or the class of the OH-functionalised polypropylene oxides. In another preferred form, at least one coextrusion layer contains 1.0 to 10% of a UV absorber.

An additional embodiment of the invention refers to a solid sheet of a composition containing 76 to 99.89 wt. % of a transparent polycarbonate, 0.01 to 20 wt. % acrylate-based polymer particles with a core-shell morphology, these polymer particles having a particle size of between 1 and 100 μm, and a first coextrusion layer containing 0.1 to 4.0% of an antistatic agent and 1.0 to 10% of a UV absorber on the one side and a second coextrusion layer containing 0.1 to 4.0% of an antistatic agent on the other side, said antistatic agents selected from among perfluoroalkylsulfonic acid salts and OH-functionalised polypropylene oxides.

The preferred antistatic agent from the class of the perfluoroalkylsulfonic acid salts is diisopropyldimethylammonium perfluorobutanesulfonate.

Preferred antistatic agents from the class of the OH-functionalised polypropylene oxides are those with the structure

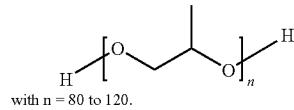

with n = 80 to 120.

These compounds preferably have a molecular weight of approx. 6000 to 8000 g/mole.

All known polycarbonates are suitable for the production of the inventive solid sheets and include homopolycarbonates, copolycarbonates and thermoplastic polyester carbonates.

The suitable polycarbonates preferably have weight average molecular weight ($\overline{M}_w$) of 18,000 to 40,000, determined by measuring the relative solution viscosity in dichloromethane or in mixtures of equal quantities by weight of phenol/o-dichlorobenzene, calibrated by light scattering.

With regard to the production of polycarbonates, reference is made, by way of examples, to "Schnell, Chemistry and Physics of Polycarbonates, Polymer Reviews, vol. 9, Interscience Publishers, New York, London, Sydney 1964" and to "D. C. PREVORSEK, B. T. DEBONA and Y. KESTEN, Corporate Research Center, Allied Chemical Corporation, Moristown, N.J. 07960, 'Synthesis of Poly(ester)carbonate Copolymers' in Journal of Polymer Science, Polymer Chemistry Edition, vol. 19, 75-90 (1980)" and to "D. Freitag, U. Grigo, P. R. Müller, N. Nouvertne, BAYER AG, 'Polycarbonates' in Encyclopedia of Polymer Science and Engineering, vol. 11, second edition, 1988, pages 648-718" and finally to "Drs. U. Grigo, K. Kircher and P. R. Müller, 'Polycarbonate' in Becker/Braun, Kunststoff-Handbuch, volume 3/1, Polycarbonate, Polyacetale, Polyester, Celluloseester, Carl Hanser Verlag Munich, Vienna 1992, pages 117-299".

The production of the polycarbonates preferably takes place by the interfacial polycondensation process or the melt transesterification process and is described below using the interfacial polycondensation process as an example.

Suitable compounds are aromatic dihydroxy compounds conforming to the general formula

wherein

Z is a divalent organic residue with 6 to 30 carbon atoms, which contains one or more aromatic groups.

Examples of these compounds are bisphenols belonging to the group of the dihydroxydiphenyls, bis(hydroxyphenyl)alkanes, indanebisphenols, bis(hydroxy-phenyl)ethers, bis(hydroxyphenyl)sulfones, bis(hydroxyphenyl)ketones and α,α'-bis(hydroxyphenyl)diisopropylbenzenes.

Particularly preferred bisphenols belonging to the above-mentioned groups of compounds are bisphenol A, tetraalkylbisphenol A, 4,4-(meta-phenylene-diisopropyl)diphenol (bisphenol M), 4,4-(para-phenylenediisopropyl)diphenol, 1,1-bis(4-hydroxyphenyl)-3,3,5-trimethylcyclohexane (bisphenol TMC) and mixtures thereof.

The bisphenol compounds to be used according to the invention are preferably reacted with carbonic acid compounds, particularly phosgene, or in the melt transesterification process with diphenyl carbonate or dimethyl carbonate.

Polyester carbonates are preferably obtained by reacting the bisphenols already mentioned, at least one aromatic dicarboxylic acid and optionally carbonic acid equivalents. Suitable aromatic dicarboxylic acids are e.g. phthalic acid, terephthalic acid, isophthalic acid, 3,3'- or 4,4'-diphenyldicarboxylic acid and benzophenonedicarboxylic acids. Part, up to 80 mole %, preferably from 20 to 50 mole %, of the carbonate groups in the polycarbonates may be replaced by aromatic dicarboxylic acid ester groups.

Inert organic solvents used in the interfacial polycondensation process are e.g. dichloromethane, the various dichloroethanes and chloropropane compounds, tetrachloromethane, trichloromethane, chlorobenzene and chlorotoluene; chlorobenzene or dichloromethane or mixtures of dichloromethane and chlorobenzene are preferably used.

The interfacial polycondensation reaction may be accelerated by catalysts, such as tertiary amines, particularly N-alkylpiperidines or onium salts. Tributylamine, triethylamine and N-ethylpiperidine are preferably used. In the case of the melt transesterification process, the catalysts mentioned in DE-A 42 38 123 are preferably used.

The polycarbonates may be branched in a conscious and controlled manner by using small quantities of branching agents. A few suitable branching agents are: phloroglucinol, 4,6-dimethyl-2,4,6-tri(4-hydroxyphenyl)heptene-2; 4,6-dimethyl-2,4,6-tri(4-hydroxyphenyl)heptane; 1,3,5-tri(4-hydroxyphenyl)benzene; 1,1,1-tri(4-hydroxyphenyl)ethane; tri(4-hydroxyphenyl)phenylmethane; 2,2-bis[4,4-bis(4-hydroxyphenyl)cyclohexyl]propane; 2,4-bis(4-hydroxyphenylisopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenylisopropyl)phenyl)orthoterephthalate; tetra(4-hydroxyphenyl)methane; tetra(4-(4-hydroxyphenylisopropyl)phenoxy)methane; α,α',α"-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and especially 1,1,1-tri(4-hydroxyphenyl)ethane and bis(3-methyl-4-hydroxyphenyl)-2-oxo-2,3-dihydroindole.

The optionally incorporated 0.05 to 2 mole %, based on diphenols used, of branching agents or mixtures of the branching agents may be used together with the diphenols but may also be added at a later stage of the synthesis.

Suitable chain terminators are preferably phenols, such as phenol, alkylphenols, such as cresol and 4-tert.-butylphenol, chlorophenol, bromophenol, cumylphenol or mixtures thereof in quantities of 1-20 mole %, preferably 2-10 mole % per mole of bisphenol. Phenol, 4-tert.-butylphenol and cumylphenol are preferred.

Chain terminators and branching agents may be added to the syntheses separately or together with the bisphenol.

The production of the polycarbonates by the melt transesterification process is described for example in DE-A 42 38 123.

Polycarbonates that are preferred according to the invention are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and the copolycarbonates based on the two monomers bisphenol A and 4,4'-dihydroxydiphenyl (DOD).

The homopolycarbonate based on bisphenol A is particularly preferred. The acrylate-based polymer particles with a core-shell morphology to be used according to the invention are, for example and preferably, those disclosed in EP-A 634 445.

The polymer particles have a core of a rubber-like vinyl polymer. The rubber-like vinyl polymer may be a homopolymer or copolymer of any of the monomers possessing at least one ethylenically unsaturated group and known to the person skilled in the art in this sector to enter into addition polymerization under the conditions of emulsion polymerization in an aqueous medium. Monomers of this type are listed in U.S. Pat. No. 4,226,752, column 3, lines 40-62.

The rubber-like vinyl polymer preferably contains at least 15%, more preferably at least 25%, most preferably at least 40%, of a polymerized acrylate, methacrylate, monovinylarene or optionally substituted butadiene, and from 0 to 85%, more preferably from 0 to 75%, most preferably from 0 to 60%, of one or more copolymerized vinyl monomers, based on the total weight of the rubber-like vinyl polymer.

Preferred acrylates and methacrylates are alkyl acrylates or alkyl methacrylates, which preferably contain 1 to 18, particularly preferably 1 to 8, most preferably 2 to 8 carbon atoms in the alkyl group, such as methyl, ethyl, n-propyl, isopropyl, n-butyl, sec.-butyl or tert.-butyl, or hexyl, heptyl or octyl groups. The alkyl group may be branched or linear. The preferred alkyl acrylates are ethyl acrylate, n-butyl acrylate, isobutyl acrylate or 2-ethylhexyl acrylate. The most preferred alkyl acrylate is butyl acrylate.

Other suitable acrylates are e.g. 1,6-hexanediol diacrylate, ethylthioethyl methacrylate, isobornyl acrylate, 2-hydroxyethyl acrylate, 2-phenoxyethyl acrylate, glycidyl acrylate, neopentyl glycol diacrylate, 2-ethoxyethyl acrylate, t-butylaminoethyl methacrylate, 2-methoxyethyl acrylate, glycidyl methacrylate or benzyl methacrylate.

Preferred monovinylarenes are styrene or α-methylstyrene, optionally substituted on the aromatic ring with an alkyl group, such as methyl, ethyl or tertiary butyl, or with a halogen, such as chlorostyrene.

If substituted, the butadiene is preferably substituted with one or more alkyl groups containing 1 to 6 carbon atoms, or with one or more halogens, most preferably with one or more methyl groups and/or one or more chlorine atoms.

Preferred butadienes are 1,3-butadiene, isoprene, chlorobutadiene or 2,3-dimethyl-1,3-butadiene.

The rubber-like vinyl polymer may contain one or more (co)polymerized acrylates, methacrylates, monovinylarenes and/or optionally substituted butadienes. These monomers may be copolymerized with one or more other copolymerizable vinyl polymers, such as diacetone acrylamide, vinylnaphthalene, 4-vinylbenzyl alcohol, vinyl benzoate, vinyl propionate, vinyl caproate, vinyl chloride, vinyl oleate, dimethyl maleate, maleic anhydride, dimethyl fumarate, vinylsulfonic acid, vinyl sulfonamide, methyl vinyl sulfonate, N-vinylpyrrolidone, vinylpyridine, divinylbenzene, vinyl acetate, vinyl versatate, acrylic acid, methacrylic acid, N-methyl methacrylamide, acrylonitrile, methacrylonitrile, acrylamide or N-(isobutoxymethyl)acrylamide.

One or more of the above-mentioned monomers are optionally reacted with 0 to 10%, preferably with 0 to 5%, of a copolymerizable, polyfunctional crosslinking agent and/or with 0 to 10%, preferably with 0 to 5%, of a copolymerizable, polyfunctional graftlinking agent, based on the total weight of the core. If a crosslinking monomer is used, it is preferably used in a content of 0.05 to 5%, more preferably of 0.1 to 1%, based on the total weight of the core monomers. Crosslinking monomers are well known in the art and generally have polyethylenic unsaturation, in which the ethylenically unsaturated groups possess approximately the same reactivity, such as divinylbenzene, trivinylbenzene, 1,3- or 1,4-triol acrylates or methacrylates, glycol di- or trimethacrylates or acrylates, such as ethylene glycol dimethacrylate or diacrylate, propylene glycol dimethacrylate or diacrylate, 1,3- or 1,4-butylene glycol dimethacrylate or, most preferably, 1,3- or 1,4-butylene glycol diacrylate. If a graftlinking monomer is used, it is preferably used in a content of 0.1 to 5%, more preferably of 0.5 to 2.5%, based on the total weight of the core monomers. Graftlinking monomers are well known in the art and are generally polyethylenically unsaturated monomers, which possess sufficiently low reactivity of the unsaturated groups so that significant residual unsaturation becomes possible, which remains in the core following its polymerization. Preferred graftlinking agents are copolymerizable allyl, methallyl or crotyl esters of α,β-ethylenically unsaturated carboxylic acids or dicarboxylic acids, such as allyl methacrylate, allyl acrylate, diallyl maleate and allyl acryloxypropionate, the most preferred being allyl methacrylate.

The polymer particles most preferably contain a core of rubber-like alkyl acrylate polymers, the alkyl group having 2 to 8 carbon atoms, optionally copolymerized with 0 to 5% crosslinking agent and 0 to 5% graftlinking agent, based on the total weight of the core. The rubber-like alkyl acrylate is preferably copolymerized with up to 50% of one or more copolymerizable vinyl monomers, e.g. those mentioned above. Suitable crosslinking and graftlinking monomers are well known to the person skilled in the art, and those of the type described in EP-A 0 269 324 are preferred.

The core of the polymer particles may contain residual oligomeric material that was used in the polymerization process to swell the polymer particles, but an oligomeric material of this type has a molecular weight sufficient to prevent its diffusion or to prevent its being extracted during processing or use.

The polymer particles contain one or more shells. One or more shells are preferably made from a vinyl homopolymer or copolymer. Suitable monomers for the production of the shell(s) are disclosed in U.S. Pat. No. 4,226,752, column 4, lines 20-46 incorporated herein by reference. One or more shells are preferably a polymer made of a methacrylate, acrylate, vinylarene, vinyl carboxylate, acrylic acid and/or methacrylic acid.

Preferred acrylates and methacrylates are alkyl acrylates or alkyl methacrylates, which preferably contain 1 to 18, more preferably 1 to 8, most preferably 2 to 8, carbon atoms in the alkyl group, such as methyl, ethyl, n-propyl, isopropyl, n-butyl, isobutyl or tert.-butyl, 2-ethylhexyl or the hexyl, heptyl or octyl groups. The alkyl group may be branched or linear. The preferred alkyl acrylate is ethyl acrylate. Other acrylates and methacrylates that may be used are those mentioned above for the core, preferably 3-hydroxypropyl methacrylate. The most preferred alkyl methacrylate is methyl methacrylate.

Preferred vinylarenes are styrene or α-methylstyrene, optionally substituted on the aromatic ring with an alkyl group, such as methyl, ethyl or tert.-butyl, or with a halogen, such as chlorostyrene.

A preferred vinyl carboxylate is vinyl acetate.

The shell(s) preferably contain(s) at least 15%, more preferably at least 25%, most preferably at least 40%, of a polymerized methacrylate, acrylate or monovinylarene and 0 to 85%, more preferably 0 to 75%, most preferably 0 to 60%, of one or more vinyl comonomers, such as other alkyl methacrylates, aryl methacrylates, alkyl acrylates, aryl acrylates, alkyl and aryl acrylamides, acrylonitrile, methacrylonitrile, maleimide and/or alkyl and aryl acrylates and methacrylates substituted with one or more substituents, such as halogen, alkoxy, alkylthio, cyanoalkyl or amino. Examples of suitable vinyl comonomers are given above. Two or more monomers may be copolymerized.

The shell polymer may contain a crosslinking agent and/or a graftlinking agent of the type mentioned above with reference to the core polymer.

The shell polymers preferably constitute 5 to 40%, more preferably 15 to 35%, of the total particle weight.

The polymer particles contain at least 15%, preferably 20 to 80%, more preferably 25 to 60%, most preferably 30 to 50%, of a polymerized alkyl acrylate or methacrylate, based on the total weight of the polymer. Preferred alkyl acrylates and methacrylates are mentioned above. The alkyl acrylate or alkyl methacrylate component may be present in the core and/or in the shell(s) of the polymer particles. Homopolymers of an alkyl acrylate or methacrylate may be used in the core and/or the shell(s), but an alkyl(meth)acrylate is preferably copolymerized with one or more other types of alkyl(meth)acrylates and/or one or more other vinyl polymers, preferably with those listed above. The polymer particles most preferably contain a core consisting of a poly(butyl acrylate) and one or more shells consisting of poly(methyl methacrylate).

The polymer particles are useful in imparting light-scattering properties to the polycarbonate. The refractive index n of core and shell(s) of the polymer particles is preferably within +/−0.25 units, more preferably within +/−0.18 units, most preferably within +/−0.12 units of the refractive index of the polycarbonate. The refractive index n of the core and shell(s) is preferably no closer than +/−0.003 units, more preferably no closer than +/−0.01 units, most preferably no closer than +1-0.05 units to the refractive index of the polycarbonate. The refractive index is measured according to the standard ASTM D 542-50 and/or DIN 53 400.

The polymer particles generally have an average particle diameter of at least 0.5 micrometers, preferably at least 2 micrometers, more preferably 2 to 50 micrometers, most preferably 2 to 15 micrometers. "Average particle size" is to be understood as the number average. Preferably at least 90%, most preferably at least 95%, of the polymer particles have a diameter of more than 2 micrometers. The polymer particles are preferably a free-flowing powder.

The polymer particles may be produced by a known method. Generally, at least one monomer component of the core polymer is subjected to emulsion polymerization with the formation of emulsion polymer particles. The emulsion polymer particles are swollen with the same or one or more other monomer components of the core polymer and the monomer(s) is/are polymerized within the emulsion polymer particles. The swelling and polymerizing steps may be repeated until the particles have grown to the desired core size. The core polymer particles are suspended in a second aqueous monomer emulsion and a polymer shell of the monomer(s) is polymerized on to the polymer particles in the second emulsion. One or more shells may be polymerized on to the core polymer. The production of core/shell polymer particles is described in EP 0 269 324 and in the U.S. Pat. Nos. 3,793,402 and 3,808,180.

In addition, it is surprisingly demonstrated that the brightness values may be increased further by using a small quantity of optical brighteners.

Compounds of the following classes may be used as optical brighteners:

a) Bis-benzoxazoles of the following structure:

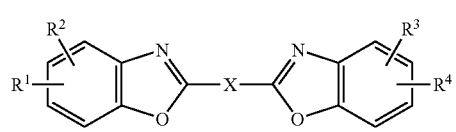

wherein $R^1$, $R^2$, $R^3$ and $R^4$, independently of one another, may denote H, alkyl, aryl, heteroaryl or halogen and X may denote the following groups:

stilbene:

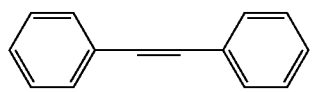

thiophene:

naphthalene:

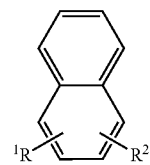

where $R^1$ and $R^2$, independently of one another, denote H, alkyl, aryl, heteroaryl or halogen.

For example Uvitex® OB from Ciba Spezialitätenchemie with the formula

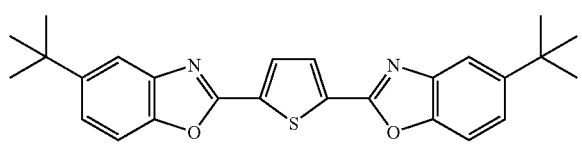

or Hostalux KCB from Clariant GmbH with the formula

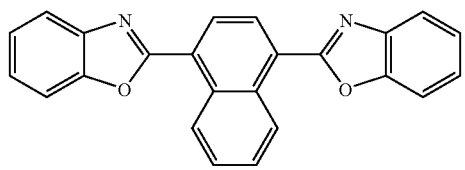

b) Phenylcoumarins of the following structure:

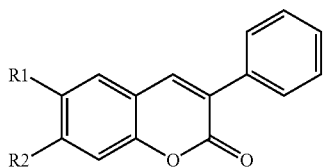

wherein $R^1$ and $R^2$, independently of one another, may denote H, alkyl, aryl, heteroaryl or halogen.

For example Leukopur® EGM from Clariant GmbH, with the formula:

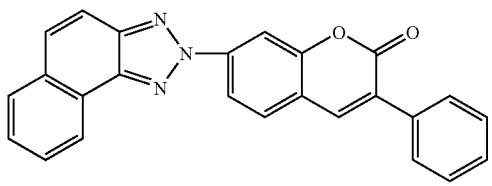

c) Bis(styryl)biphenyls of the following structure:

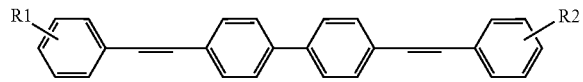

wherein $R^1$ and $R^2$, independently of one another, may denote H, alkyl, aryl, heteroaryl or halogen.

A preferred embodiment of the invention is therefore represented by the inventive solid sheet which additionally contains 0.001 to 0.2 wt. %, preferably about 1000 ppm, of an optical brightener of the class of bis-benzoxazoles, phenylcoumarins or bis(styryl)biphenyls.

A particularly preferred optical brightener is Uvitex OB from Ciba Spezialitätenchemie, Switzerland.

The solid sheets according to the invention may be produced either by injection molding or by extrusion. If the solid sheets have a large surface area, they cannot be produced economically by injection molding for technical reasons. In these cases, the extrusion process is preferable. For the extrusion, polycarbonate pellets are fed into the extruder and melted in the extruder's plasticising system. The plastic melt is pressed through a sheet die and shaped there, brought into the desired final shape in the nip of a polishing calender and fixed in shape by cooling on both sides on polishing rolls and by the ambient air. The polycarbonates with a high melt viscosity used for the extrusion are conventionally processed at melt temperatures of 240 to 320° C., and the barrel temperatures of the plasticizing barrel and die temperatures are adjusted accordingly.

By using one or more side extruders and suitable melt adapters upstream of the sheet die, polycarbonate melts of different compositions may be placed one on top of the other, thus producing multi-layer solid sheets (cf. e.g. EP-A 0 110 221 and EP-A 0 110 238).

The thickness of the solid sheets according to the invention is generally 0.5 to 3 mm.

Both the base layer and any coextrusion layer(s) present in the shaped articles according to the invention may additionally contain additives, such as e.g. UV absorbers and other conventional processing auxiliaries, particularly mold release agents and free-flow agents, as well as the stabilizers conventional for polycarbonates, particularly heat stabilizers, and optical brighteners. Different additives and different concentrations of additives may be present in each layer. In particular, any coextrusion layers present may contain UV absorbers and mold release agents.

In a preferred embodiment, the composition of the solid sheet or base layer additionally contains 0.01 to 0.5 wt. % of a UV absorber from the classes of benzotriazole derivatives, dimeric benzotriazole derivatives, triazine derivatives, dimeric triazine derivatives and diaryl cyanoacrylates.

The UV protective layer preferably consists of at least one coextrusion layer with at least one UV absorber in a proportion of 0.1 to 20 wt. %, based on the coextrusion layer.

Suitable stabilizers are e.g. phosphines, phosphites or Si-containing stabilizers and other compounds described in EP-A 0 500 496. Triphenyl phosphites, diphenylalkyl phosphites, phenyldialkyl phosphites, tris(nonylphenyl)phosphite, tetrakis(2,4-di-tert.-butylphenyl)-4,4'-biphenylene diphosphonite, bis(2,4-dicumylphenyl)pentaerythritol diphosphite and triaryl phosphite may be mentioned as examples. Triphenylphosphine and tris(2,4-di-tert.-butylphenyl)phosphite are particularly preferred.

Suitable mold release agents are e.g. the esters or partial esters of monohydric to hexahydric alcohols, particularly of glycerol, pentaerythritol or Guerbet alcohols.

Monohydric alcohols are e.g. stearyl alcohol, palmityl alcohol and Guerbet alcohols, a dihydric alcohol is e.g. glycol, a trihydric alcohol is e.g. glycerol, tetrahydric alcohols are e.g. pentaerythritol and mesoerythritol, pentahydric alcohols are e.g. arabitol, ribitol and xylitol and hexahydric alcohols are e.g. mannitol, glucitol (sorbitol) and dulcitol.

The esters are preferably the monoesters, diesters, triesters, tetraesters, pentaesters and hexaesters or mixtures thereof, particularly random mixtures, of saturated, aliphatic $C_{10}$-$C_{36}$ monocarboxylic acids and optionally hydroxymonocarboxylic acids, preferably with saturated aliphatic $C_{14}$ to $C_{32}$ monocarboxylic acids and optionally hydroxymonocarboxylic acids.

The commercially available fatty acid esters, particularly of pentaerythritol and glycerol, may contain <60% of different partial esters as a result of their production.

Saturated, aliphatic monocarboxylic acids with 10 to 36 C atoms are e.g. capric acid, lauric acid, myristic acid, palmitic acid, stearic acid, hydroxystearic acid, arachidic acid, behenic acid, lignoceric acid, cerotic acid and montanic acids.

Preferred saturated, aliphatic monocarboxylic acids with 14 to 22 C atoms are e.g. myristic acid, palmitic acid, stearic acid, hydroxystearic acid, arachidic acid and behenic acid.

Particularly preferred are saturated, aliphatic monocarbokylic acids such as palmitic acid, stearic acid and hydroxystearic acid.

The saturated, aliphatic $C_{10}$ to $C_{36}$ carboxylic acids and the fatty acids are either known per se from the literature or may be produced by processes known from the literature. Examples of pentaerythritol fatty acid esters are those of the particularly preferred monocarboxylic acids mentioned above.

Particularly preferred are esters of pentaerythritol and of glycerol with stearic acid and palmitic acid.

Particularly preferred are also esters of Guerbet alcohols and of glycerol with stearic acid and palmitic acid and optionally hydroxystearic acid.

Suitable UV absorbers are e.g.

a) Benzotriazole derivatives according to formula (I):

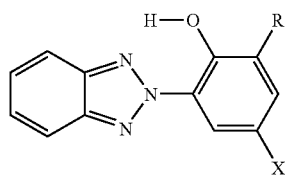

formula (I)

In formula (I), R and X are the same or different and signify H or alkyl or alkylaryl.

Preferred are Tinuvin 329 with X=1,1,3,3-tetramethylbutyl and R=H Tinuvin 350 with X=tert.-butyl and R=2-butyl Tinuvin 234 with X=R=1,1-dimethyl-1-phenyl.

b) Dimeric benzotriazole derivatives according to formula (II):

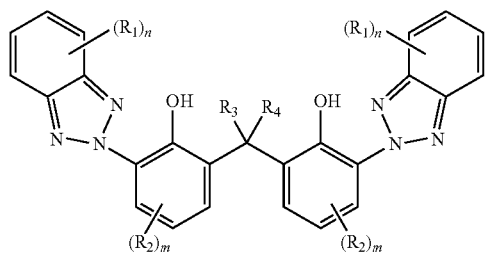

formula (II)

In formula (II), $R^1$ and $R^2$ are the same or different and signify H, $C_1$-$C_{10}$ alkyl, $C_5$-$C_{10}$ cycloalkyl, $C_7$-$C_{13}$ aralkyl, $C_6$-$C_{14}$ aryl, —$OR^5$ or —(CO)—O—$R^5$ with $R^5$=H or $C_1$-$C_4$ alkyl.

In formula (II), $R^3$ and $R^4$ are also the same or different and signify H, halogen, $C_1$-$C_4$ alkyl, $C_5$-$C_6$ cycloalkyl, benzyl or $C_6$-$C_{14}$ aryl.

In formula (II), m signifies 1, 2 or 3 and n signifies 1, 2, 3 or 4.

Preferred is Tinuvin 360 with $R^1$=$R^3$=$R^4$=H; n=4; $R^2$=1,1,3,3-tetramethylbutyl; m=1.

b1) Dimeric benzotriazole derivatives according to formula (III)

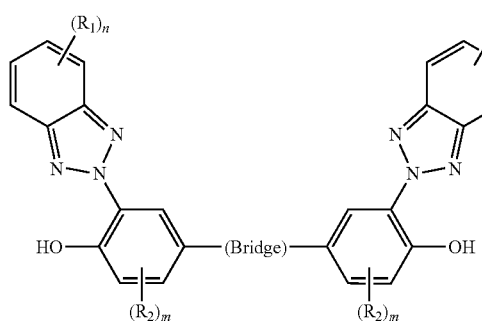

formula (III)

wherein the bridge signifies

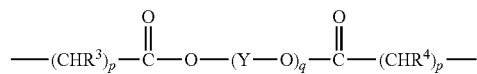

$R^1$, $R^2$, m and n have the meaning given for formula (II), and wherein p is an integer from 0 to 3,
q is an integer from 1 to 10,
Y=—$CH_2$—$CH_2$—, —$(CH_2)_3$—, —$(CH_2)_4$—, —$(CH_2)_5$—, —$(CH_2)_6$— or $CH(CH_3)$—$CH_2$— and
$R^3$ and $R^4$ have the meaning given for formula (II).

Preferred is Tinuvin 840 with $R^1$=H; n=4; $R^2$=tert.-butyl; m=1; $R^2$ is placed in ortho position to the OH group; $R^3$=$R^4$=H; p=2; Y=—$(CH_2)_5$—; q=1 c) Triazine derivatives according to formula (IV):

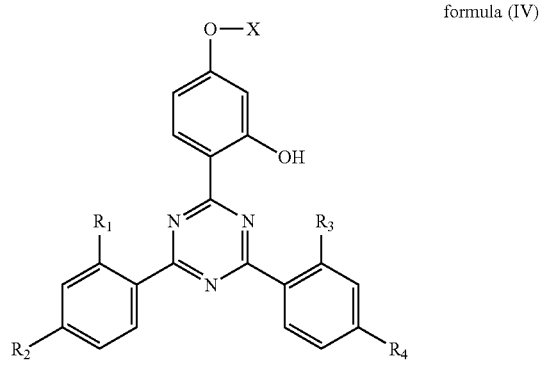

formula (IV)

wherein $R^1$, $R^2$, $R^3$, $R^4$ in formula (IV) are the same or different and are H or alkyl or CN or halogen and X=alkyl.

Preferred are Tinuvin 1577 with $R^1$=$R^2$=$R^3$=$R^4$=H; X=hexyl and Cyasorb UV-1164 with $R^1$=$R^2$=$R^3$=$R^4$=methyl; X=octyl.

d) Triazine derivatives of the following formula (IVa)

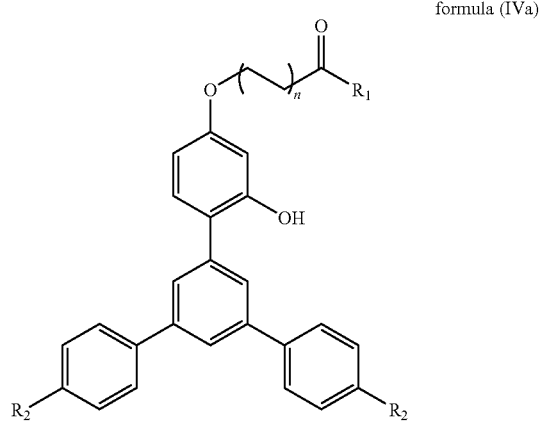

formula (IVa)

wherein
$R^1$ signifies $C_1$ alkyl to $C_{17}$ alkyl,
$R^2$ signifies H or $C_1$ alkyl to $C_4$ alkyl and
n equals 0 to 20.

e) Dimeric triazine derivatives of formula (V):

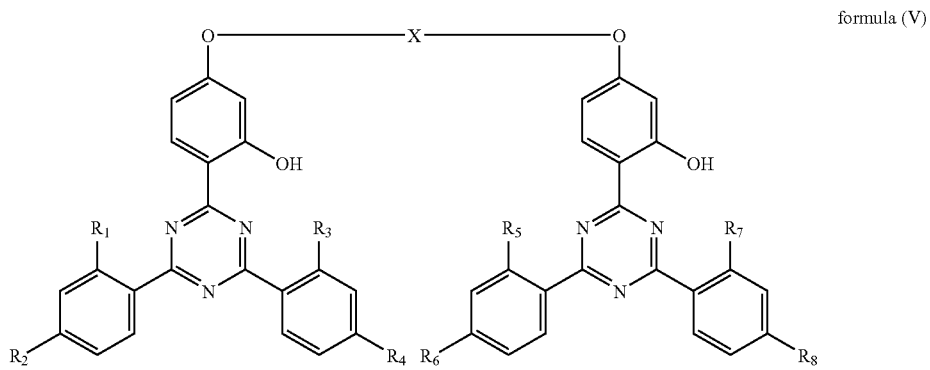

formula (V)

wherein
$R^1$, $R^2$, $R^3$, $R^4$, $R^5$, $R^6$, $R^7$, $R^8$ in formula (V) may be the same or different and signify H or alkyl or CN or halogen and
X=alkyl or —$(CH_2CH_2$—O—$)_n$—C(=O)—.

f) Diaryl cyanoacrylates of formula (VI):

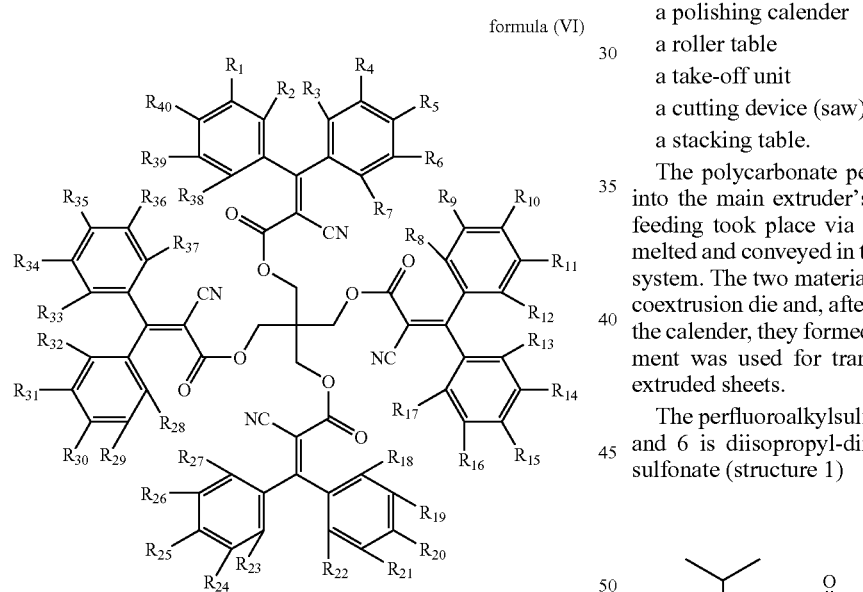

formula (VI)

wherein $R^1$ to $R^{40}$ may be the same or different and signify H, alkyl, CN or halogen.
Preferred is Uvinul 3030 with $R^1$ to $R^{40}$=H.

The above-mentioned UV absorbers are known to the person skilled in the art and some are commercially available.

The following examples are intended to explain the invention but without limiting it.

EXAMPLES

The 1.5 mm solid sheets referred to in Examples 1 to 6 were produced as follows:
1. Production of the compound with conventional twin-screw compounding extruders (e.g. ZSK 32) at processing temperatures conventional for polycarbonate of 240 to 330° C.
2. The machines and apparatus used for the production of the optionally coextruded 2 mm solid sheets comprise:
   the main extruder with a screw having a length of 33 D and a diameter of 70 mm with venting
   a coextruder for applying the outer layer with a screw having a length of 25 D and a diameter of 35 mm
   a special coextrusion sheet die with a width of 450 mm
   a polishing calender
   a roller table
   a take-off unit
   a cutting device (saw)
   a stacking table.

The polycarbonate pellets of the base material were fed into the main extruder's feed hopper. In Examples 4 to 6, feeding took place via a side extruder. Each material was melted and conveyed in the relevant barrel/screw plasticizing system. The two material melts were brought together in the coextrusion die and, after leaving the die and being cooled in the calender, they formed a composite. The remaining equipment was used for transporting, cutting and stacking the extruded sheets.

The perfluoroalkylsulfonic acid salt used in Examples 3, 5 and 6 is diisopropyl-dimethylammonium perfluorobutane-sulfonate (structure 1)

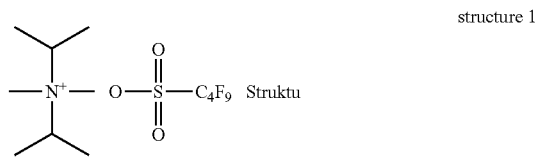

structure 1

Struktu

The OH-functionalised polypropylene oxide used in Examples 2 and 4 is an OH end-capped polypropylene oxide of structure 2 with a molecular weight of approx. 6000 to 8000 g/mole (antistatic agent AT 36 from Lanxess).

structure 2

Example 1

A compound of the following composition was produced:
Polycarbonate: Makrolon CD 2005 from Bayer Material Science AG, having a refractive index of 1.586 in a proportion of 97.6 wt. %
Core-shell particles with a butadiene-styrene core and a methyl methacrylate shell: Paraloid EXL 5137 from Rohm & Haas, having a refractive index of 1.49 with a particle size of 2 to 15 µm and an average particle size of 8 µm in a proportion of 2.4 wt. %.
A 1.5 mm solid sheet without a coextrusion layer was extruded from this compound.

Example 2

A compound of the following composition was produced:
Polycarbonate: Makrolon CD 2005 in a proportion of 96.6 wt. %
Core-shell particles: Paraloid EXL 5137 in a proportion of 2.4 wt. %
Antistatic agent: AT 36 from Lanxess in a proportion of 1.0 wt. %.
A 1.5 mm solid sheet without a coextrusion layer was extruded from this compound.

Example 3

A compound of the following composition was produced:
Polycarbonate: Makrolon CD 2005 in a proportion of 97.4 wt. %
Core-shell particles: Paraloid EXL 5137 in a proportion of 2.4 wt. %
Diisopropyldimethylammonium perfluorobutanesulfonate in a proportion of 0.2 wt. %.
A 1.5 mm solid sheet without a coextrusion layer was extruded from this.

Example 4

A compound of the following composition was produced:
Polycarbonate: Makrolon CD 2005 in a proportion of 97.6 wt. %
Core-shell particles: Paraloid EXL 5137 in a proportion of 2.4 wt. %.
A 1.5 mm solid sheet was extruded from this with a one-sided coextrusion layer of the following composition:
Polycarbonate: Makrolon CD 2005 in a proportion of 96.6 wt. %
UV absorber: Cyasorb UV 3638 from Cytec in a proportion of 5.0 wt. %
Antistatic agent: AT 36 in a proportion of 2.0 wt. %.

Example 5

A compound of the following composition was produced:
Polycarbonate: Makrolon CD 2005 in a proportion of 97.6 wt. %
Core-shell particles: Paraloid EXL 5137 in a proportion of 2.4 wt. %.
A 1.5 mm solid sheet was extruded from this with a one-sided coextrusion layer of the following composition:
Polycarbonate: Makrolon CD 2005 in a proportion of 96.6 wt. %
UV absorber: Cyasorb UV 3638 in a proportion of 5.0 wt. %
Diisopropyldimethylammonium perfluorobutanesulfonate in a proportion of 0.4 wt. %.

Example 6

A compound of the following composition was produced:
Polycarbonate: Makrolon CD 2005 in a proportion of 97.4 wt. %
Core-shell particles: Paraloid EXL 5137 in a proportion of 2.4 wt. %
Diisopropyldimethylammonium perfluorobutanesulfonate in a proportion of 0.2 wt. %.
A 1.5 mm solid sheet was extruded from this with a one-sided coextrusion layer of the following composition:
Polycarbonate: Makrolon CD 2005 in a proportion of 96.6 wt. %
UV absorber: Cyasorb UV 3638 in a proportion of 5.0 wt. %
Diisopropyldimethylammonium perfluorobutanesulfonate in a proportion of 0.4 wt. %.

The 1.5 mm solid sheets listed in Examples 1 to 6 were investigated with regard to their optical properties according to the following standards and using the following measuring instruments:

To determine the light transmission (Ty (D6510°)) and the light reflection (Ry(D6510°) against a white background), an Ultra Scan XE from Hunter Associates Laboratory, Inc. was used. In addition, this instrument was used for the measurements to determine the yellowness index (YI(D65, C2°), ASTM E 313), the x, y color values (D65, C2°, CIE standard color chart) and the L, a, b color values (D65, C2°, CIELAB color system, DIN 6174).

For the haze determination, (according to ASTM D 1003), a Hazegard Plus from Byk Gardner was used.

The brightness measurements were on a backlight unit (BLU) from DS LCD (LTA320W2-L02, EW" LCD TV Panel) using an LS100 Luminance Meter from Minolta. For these measurements, the standard diffuser plate was removed and replaced in each case by the 2 mm solid sheets produced in Examples 1 to 6.

The results of the measurements are compiled in Table 1 below.

TABLE 1

Optical data for the 2 mm solid sheets

|  | Example 1 | Example 2 | Example 3 |
|---|---|---|---|
| Ty[%] (C. 2°) Hunter Ultra Scan | 57.78 | 61.77 | 63.60 |
| Ry[%] (C. 2°) Hunter Ultra Scan | 83.79 | 89.37 | 87.22 |
| YI (C. 2°) | −16.85 | −17.06 | −16.40 |
| L* (C. 2°) | 80.62 | 82.79 | 83.76 |
| a* (C. 2°) | −0.33 | 0.09 | 0.22 |
| b* (C. 2°) | −7.14 | −7.54 | −7.39 |
| Haze [%] | 100 | 100 | 100 |
| Brightness [cd/m2] without films | 5900 | 6000 | 6025 |
| Brightness [cd/m2] with films | 7600 | 7725 | 7750 |

|  | Example 4 | Example 5 | Example 6 |
|---|---|---|---|
| Ty[%] (C. 2°) Hunter Ultra Scan | 63.75 | 61.90 | 60.18 |
| Ry[%] (C. 2°) PE Lambda 900 | 83.42 | 83.95 | 86.34 |
| YI (C. 2°) | −15.73 | −2.39 | −3.52 |
| L* (C. 2°) | 83.83 | 82.86 | 81.94 |

TABLE 1-continued

| Optical data for the 2 mm solid sheets | | | |
|---|---|---|---|
| a* (C. 2°) | 0.19 | −0.86 | −0.93 |
| b* (C. 2°) | −7.09 | −0.75 | −1.22 |
| Haze [%] | 100 | 100 | 100 |
| Brightness [cd/m2] without films | 6025 | 6000 | 6000 |
| Brightness [cd/m2] with films | 7700 | 7650 | 7725 |

Dust Test:

The antistatic action by dusting with activated carbon is performed as follows:

The activated carbon powder (particle size 90%<0.08 mm, article no. C7606 from Aldrich) is poured into the 2 liter beaker to a level of approx. 15 mm. It is then agitated for approx 10 s (seconds) so that an activated carbon powder atmosphere is created. During this operation the beaker is sealed with aluminium foil. The sample sheet is held in for 7 s using a film clamp so that carbon dust may settle on the surface. The sheet is then photographed.

The result is obtained visually by comparison with a sheet having no antistatic finish with reference to the dust pictures.

TABLE 2

| Dust deposits on the different diffuser sheets | | |
|---|---|---|
|  | Dust deposits Front | Dust deposits Reverse |
| Example 1 | heavy | heavy |
| Example 2 | light | light |
| Example 3 | light | light |
| Example 4 | light | heavy |
| Example 5 | light | heavy |
| Example 6 | light | light |

In all the examples listed in Table 1, the content of scattering pigment is the same. The base material used is also the same. It is particularly surprising that the diffuser plates from Example 1 have the lowest brightness in the BLU. This is the case both with and without a set of films. In all the other examples, 2 to 6, either the antistatic agent of structure 1 (diisopropyldimethylammonium perfluorobutanesulfonate) or the antistatic agent of structure 2 (antistatic agent AT36) is contained either in the base material or in the coextrusion layer or in both. These diffuser plates surprisingly exhibit greater brightness than Example 1 with the same content of scattering agent and therefore the same scattering action.

In this comparison, the brightness investigated is striking. The following procedure was used to measure this value: appropriate pieces were sawn out of the sheets under consideration from Examples 1 to 6 and fitted into a backlight unit (BLU) from DS LCD, (LTA320W2-L02, 32" LCD TV Panel). The brightness was then investigated with and without the set of films used in this backlight unit. In this test, the brightness was measured at a total of 9 different points on the backlight unit (using a Minolta Luminance Meter LS100) and the average of these was calculated.

It may be seen in all the examples that the brightness is lower without the film pack than with the film pack.

The effect of the antistatic agents used may be seen very clearly in the dust pictures for Examples 1 to 6. Thus, the deposits in Example 1 are very heavy and in Examples 2, 3 and 6 very light. In these examples, the antistatic agent is on both sides of the sample sheets investigated. In Examples 4 and 5, the antistatic agent is only on the coextruded side and the corresponding effect of a light dust deposit may be seen here. The dark shadows visible on the front view of Examples 4 and 5 are the dust pattern from the reverse, without an antistatic finish, which shows through and may be seen more clearly on the reverse view.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A solid sheet comprising a transparent aromatic polycarbonate matrix, particles of a transparent polymer and an antistatic agent comprising a perfluoroalkylsulfonic acid ammonium salt, wherein the refractive index of said matrix differs from that of said polymer.

2. The solid sheet according to claim 1 wherein the polycarbonate is present in an amount of 76 to 99.89% and the particles of transparent polymer are present in an amount of 0.01 to 20% and the antistatic agent is present in an amount of 0.1 to 4.0%, the percents all occurrences being relative to the weight of the sheet.

3. The solid sheet of claim 2 wherein said transparent polymer is acrylate-based polymer particles having core-shell morphology and particle size of 1 to 100 μm.

4. A laminate comprising the solid sheet according to claim 1 and at least one coextruded layer.

5. The laminate according to claim 4 wherein coextruded layer contains 0.1 to 4.0% of an antistatic agent comprising a perfluoroalkylsulfonic acid salt and 1.0 to 10% of a UV absorber, the percents both occurrences relative to the weight of the coextruded layer.

6. The solid sheet according to claim 1 having a thickness of 0.5 to 3 mm.

7. A laminate comprising a first layer consisting of 76 to 99.89 percent of transparent polycarbonate and 0.01 to 20 percent of an acrylate-based polymer particles having a core-shell morphology, and particle size of 1 to 100 μm, said percents both occurrences being relative to the weight of said first layer, and two coextruded layers each adherently bound to a different surface of said first layer and each of said coextruded layers containing 0.1 to 4.0% of an antistatic agent comprising a perfluoroalkylsulfonic acid salt and 1.0 to 10% of a UV absorber, said %, both occurrences being relative to the weight of said coextruded layers.

8. A laminate comprising a first layer consisting of 76 to 99.89 percent of a transparent polycarbonate and 0.01 to 20 percent of an acrylate-based polymer particles having a core-shell morphology and a particle size of 1 to 100 μm said percents, both occurrences being relative to the weight of said first layer, a first coextruded layer containing 0.1 to 4.0% relative to the weight of said first coextruded layer of an antistatic agent comprising a perfluoroalkylsulfonic acid salt and 1.0 to 10% relative to the weight of said first coextruded layer of a UV absorber adherently bound on one surface of the first layer, and a second coextruded layer containing 0.1 to 4.0% relative to the weight of said second coextruded layer of an antistatic agent adherently bound to the other side of said first layer.

9. The laminate of claim 8 wherein the antistatic agent is diisopropyldimethylammonium perfluorobutanesulfonate.

* * * * *